United States Patent
Nehru et al.

(10) Patent No.: US 7,062,499 B2
(45) Date of Patent: Jun. 13, 2006

(54) ENHANCED MULTIWAY RADIX TREE AND RELATED METHODS

(75) Inventors: Archana Nehru, Los Angeles, CA (US); Manoj Paul, Karnatake (IN); Matthys Johannes Nel, Gauteng (ZA)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 10/043,764

(22) Filed: Jan. 8, 2002

(65) Prior Publication Data

US 2003/0130981 A1 Jul. 10, 2003

(51) Int. Cl.
*G06F 17/30* (2006.01)

(52) U.S. Cl. .............................. 707/101; 707/102; 707/3

(58) Field of Classification Search ............... 707/1–10, 707/100–104.1
See application file for complete search history.

(56) References Cited

U.S. PATENT DOCUMENTS 5,095,458 A * 3/1992 Lynch et al. ................. 708/713
5,546,390 A * 8/1996 Stone .......................... 370/408
5,873,078 A * 2/1999 Angle et al. .................... 707/3
6,298,340 B1 * 10/2001 Calvignac et al. .............. 707/3
6,396,842 B1 * 5/2002 Rochberger .................. 370/408

OTHER PUBLICATIONS

Douglas Comer: "Heuristics for Trie Index Minimization" ACM Transactions on Database Systems (TODS), vol. 4, No. 3, Sep. 1979 pp. 383-395, XP002271882.
Edward Fredkin: "Trie Memory", Communication of the ACM, vol. 3, No. 9, Aug. 1960, pp. 490-199, XP002271883.
Donald E. Knuth: "Sorting and Searching—The Art of Computer Programming", vol. 3, 1973, pp. 490-505, XP002271884.

* cited by examiner

*Primary Examiner*—Jeffrey Gaffin
*Assistant Examiner*—Yicun Wu
(74) *Attorney, Agent, or Firm*—Blakely, Sokoloff, Taylor & Zafman LLP (57) ABSTRACT

A method and apparatus for assigning a logical level number to a symbol in a key comprising a string of symbols, and storing an entry for the key in a level of nodes in a multiway radix tree based at least in part on the logical level number instead of on a path between nodes representing every symbol in the key.

11 Claims, 9 Drawing Sheets

ENHANCED MULTIWAY RADIX TREE AND RELATED METHODS

The present invention relates to the field of data structures and more specifically to an enhanced multiway radix tree and related methods.

BACKGROUND

The ability of computer systems to process data at high speeds results partly from their ability to randomly access particular items of information within file allocation tables and databases very rapidly. Quick access to specific data is facilitated by the organization imparted to tables and databases arranged on a storage medium or in memory. In the case of a database, the organization usually includes partitioning the data into records, and each record into fields. For example, each record may correspond to a person, and within the record for that person, one field may be the person's name, and another field may be the person's address. Such organization speeds up searches for particular items of data, because when fields are located in the same part of each record, only the fields of interest, and not the entire record, may have to be searched.

A particular field associated with a group of records and singled out for searching is sometimes called a key field, although keys may be any item by which a group of records is searched or sorted. For example, if a database of names and addresses is searched by zip codes, then the zip code is the key for each record. Each key usually has some link to the record with which it is associated so that if the key is found, the associated record may be found. Key searches may be performed relatively quickly by loading the keys into the memory of a computer, organizing, and searching the keys electronically.

Keys loaded into the memory of a computer system may be searched sequentially. However, there are many schemes for finding a desired key quickly and efficiently without examining each key in sequential fashion. One scheme to streamline a key search is batching the keys in groups and using a string function to find which batch contains the correct key. The correct key is then extracted from its batch. Another search scheme is to first sort the keys, so that a key may then be found relative to the other keys based on a single quality, such as a first letter of the key, or the key's numerical value. If the number of keys to be sorted is small, any sort algorithm implemented in a short executable program is adequate. However, as the number of keys becomes large, it is important to use a faster sort technique, even if the technique is more complicated. One of the fastest and most efficient methods to sort keys is to arrange the keys in a tree, so that a search starting at a root position need only find the correct branches, sub-branches, and leaf to find the correct key. There are numerous other known sorting schemes, for example the quicksort, the bubble sort, the insertion sort, the merge sort, the selection sort, the shell sort, and the radix sort.

Radix sorting logically arranges keys as a multiway radix tree ("MRT") so that a computer can traverse the branches of the tree, and therefore the items being searched, very quickly. The term "radix" is used to indicate the base of a numbering system, for example, binary numbers have a radix of 2, and decimal numbers have a radix of 10. The radix number usually defines the number of symbols that may be used to construct keys. In general, a radix sort arranges data by classifying each item of data based on some attribute it possesses, rather than by comparing it to other data items to find its relative place in an arrangement. For example, if sorting words, all the words beginning with the letter "a" might be put into one group, all the words beginning with "b" into another group, and so on. The members of each group could then be sorted in the same way using the second letter of each word. If the groups were arranged in a tree, then to find a key comprising the sequence "abc," a link would be traversed from a root of the tree to the "a" branch, then from the "a" branch to the "b" sub-branch, and from the "b" sub-branch to the "c" leaf. When the "c" leaf is reached, it may point to or contain an address identifying the location of an entry associated with the key. The entry may contain anything, for example, a record number, a pointer to a subroutine in a program, a symbol, and even the key itself.

The individual symbols of a key arranged in a MRT are usually called nodes, or may be stored in memory spaces called nodes. Each key in an index file arranged as a MRT usually has several added bytes that are used as pointers, called links. Links join a node to one or more nodes, such as a group of child nodes linked to the root node, which is the starting point for traversing the tree. Other child nodes may be linked to the child nodes. A node between a child node and the root node is, in turn, a parent node to the child node.

A MRT then, is a table of keys organized as a tree, usually to index a data file, wherein the keys are sorted according to the symbols they contain. Although each node on a MRT corresponds to an individual symbol from the set of symbols used to construct the keys, each node in a MRT also logically represents the sequence of symbols embodied in its parent nodes along a path from the root node to itself. Thus, a unique path between nodes represents each key in the tree. The unique paths allow short, direct access to keys from the root node. In known MRTs, the number of nodes in a path from the root node to the last node of the key equals the number of symbols in the key.

In known MRT schemes, memory space is reserved not only for actual key entries, but also for potential key entries that could be added to the tree at a later time using numerous combinations of the symbols allowed in each scheme. In other words, known MRT schemes build more of the MRT structure than is needed to add a given key by requiring that every symbol in a key be represented at a different level. The number of wasted memory spaces in known MRT schemes can be calculated. The memory spaces allotted for one level typically equal the radix, the possible symbols "m" used to construct keys. Thus, the value of m depends on the "alphabet" of symbols selected to construct keys in a particular scheme. For example, keys using the English alphabet have twenty-six possible symbols. Numeric keys have an m value equal to the base of the numbering system used. For example, m equals 2 for binary keys, m equals 10 for decimal keys, and m equals 16 for hexadecimal keys. Since known MRTs create a tree by assigning each symbol in the key to a level containing m nodes, a key having n symbols is allotted n levels of m nodes. As an example, when the word "apples" is used as a key, a level containing twenty-six nodes would typically be allotted for each of the six symbols in the key resulting in a memory allotment of 156 nodes. Key entries containing similar symbols may use some of the empty nodes. But at least one new level of m nodes must be added to the tree whenever a key to be added to the tree possesses more symbols than any key already present in the tree. Allocating memory by assigning each symbol in a key to a unique level may result in unnecessarily large, relatively empty MRTs consisting largely of wasted memory space, awkward and slow to traverse. This is especially true when the table of keys is relatively sparse.

DETAILED DESCRIPTION OF THE INVENTION

What is described herein is an enhanced multiway radix tree and related methods. The invention alters the traditional structure of a MRT so that the number of nodes in a path from the root node to an entry for the key may be less than the number of symbols in the key. The invention may be used to perform fast and efficient key searches in a control circuit and/or in the memory of a computing device.

The invention creates MRTs needing a reduced amount of tree data structure to store keys. In accordance with one embodiment of the invention, an enhanced MRT may be used that creates a logical level of nodes for each of the first and last symbols of a key on two physical levels of nodes, but does not create intermediate levels of nodes to represent the symbols in the key between the first and the last symbols. Thus, although the invention may use an enhanced MRT that lacks intermediate levels of nodes, each stored key may be logically represented on the enhanced MRT in ways similar to that of a traditional, non-enhanced MRT, while using less memory.

In another embodiment of the invention, an enhanced MRT may use the shortest possible sequence of symbols to store an entry for the key in the tree. If a node not storing a key entry is found during a sequential examination of nodes, an entry for the key is inserted without examining the tree for succeeding symbols in the key. If no empty node is found and a node corresponding to the next symbol in the key does not exist, then the needed node is created and an entry for the key is inserted without searching the tree for succeeding symbols in the key.

Terminology such as "storing a key," "inserting a key," and "storing/inserting an entry for a key" will all have substantially the same meaning for purposes of describing the invention: at some node on an enhanced MRT an entry is stored for the key. Persons having ordinary skill in the art will appreciate that an entry may be a memory space associated with the key, a pointer to a memory space, a pointer to a record, an instruction to perform a procedure, and/or a representation of the key itself, any of which may be attached to the node representing the key.

Figure 1:
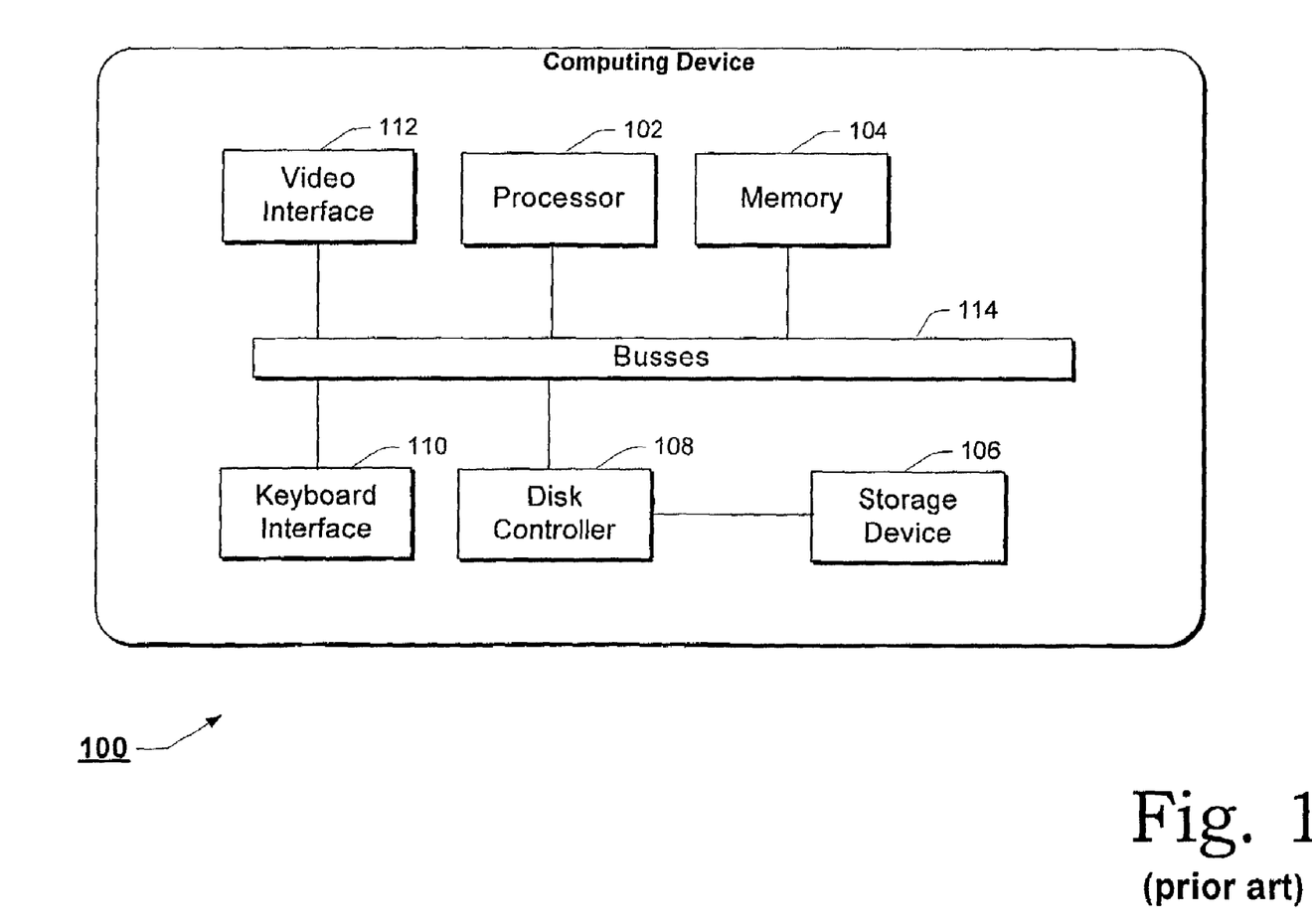
FIG. 1 is a graphic representation of a computing device suitable for practicing some embodiments of the present invention.

FIG. 1 shows a computing device 100 suitable for practicing embodiments of the invention. The computer system 100 contains a processor 102, a memory 104, a storage device 106, a disk controller 108, a keyboard interface 110, and a video interface 112, coupled as illustrated by one or more busses 114. The processor 102 accesses data, including computer programs that may be stored in the storage device 106. In addition, the processor 102 transfers computer programs into the memory 104 and executes the programs once resident in the memory. In one embodiment, the invention may be software that resides as a stored program on the storage device 106. After being accessed by the processor 102, the invention may implement one or more enhanced radix trees according to the teachings of the invention in memory 104. In another embodiment, the invention could be hardware or a combination of hardware and software on a discrete module attached to one or more busses 114. A person having ordinary skill in the art will appreciate that a computing device 100 suitable for practicing the invention may contain additional or different components.

Figure 2:
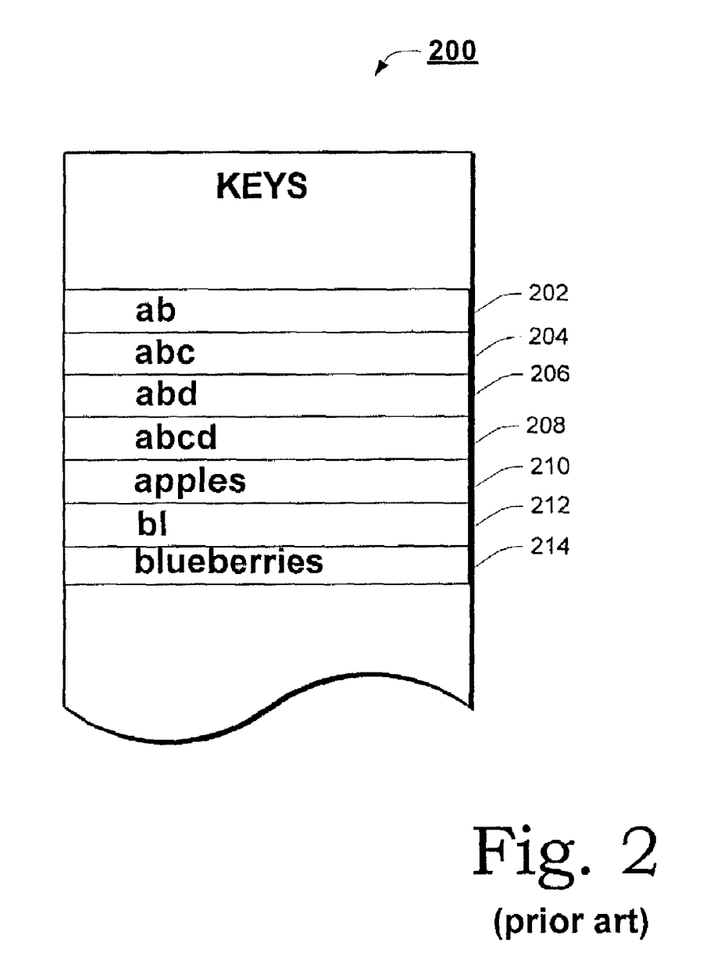
FIG. 2 is a table of keys that may be organized and searched by prior art MRTs and by a MRT of the invention.

FIG. 2 shows a table of keys 200 suitable for arrangement as a MRT in a computer memory. For this example, the keys are comprised of two to eleven symbols, but the keys could be any length or all the same length. In this example, the symbols used to construct the keys are the letters of the English alphabet, but any finite set of symbols could be used. A typical table for indexing computer data files usually has substantially more keys than this example.

Figure 3:
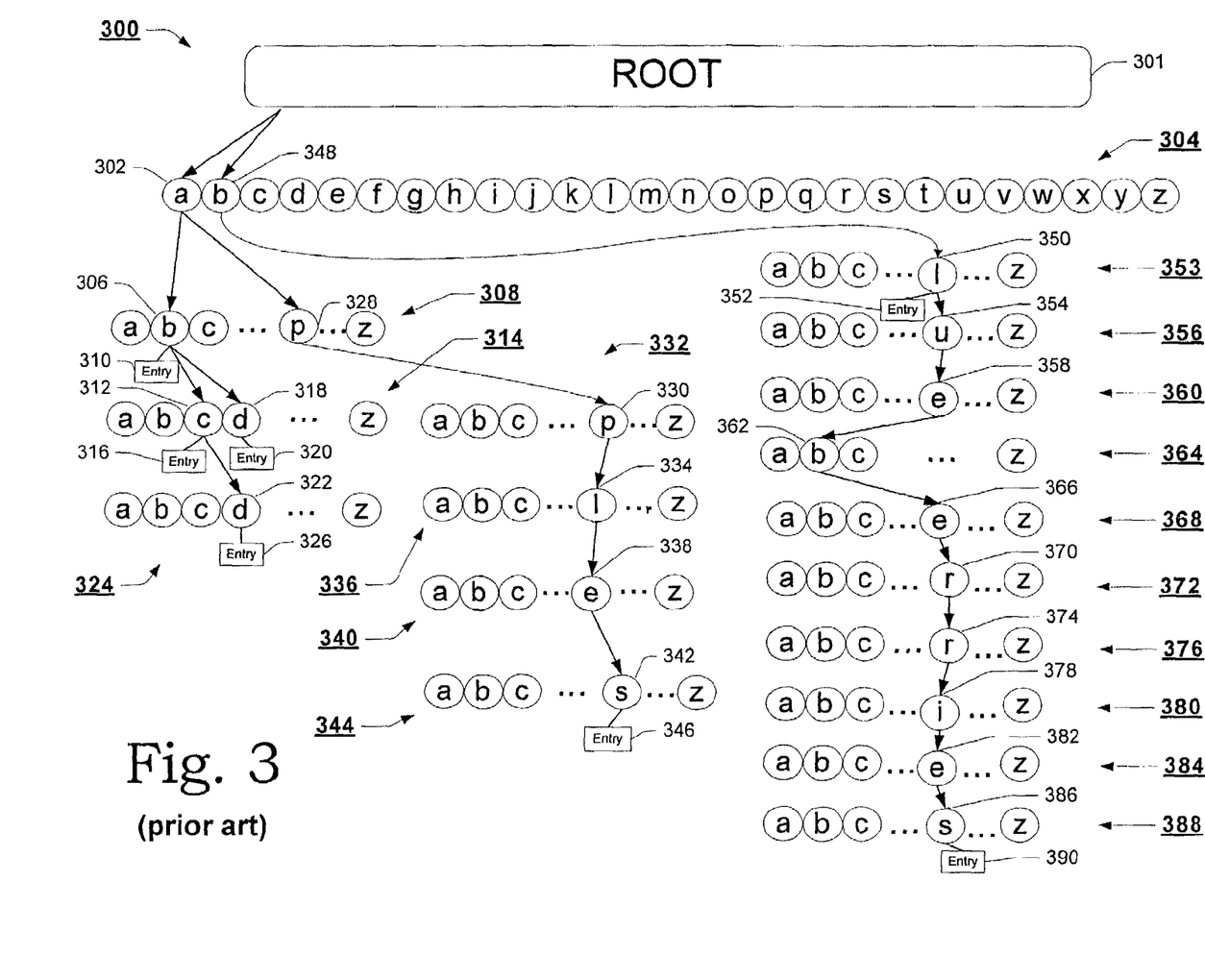
FIG. 3 is a diagrammatic representation of a prior art MRT.

FIG. 3 shows a prior art MRT 300 that organizes the table of keys 200 shown in FIG. 2 for multiway radix searching. Taking the first key, "ab" 202, in the table of keys 200 as an example, a root node 301 points to a child node 302 in a first level 304 of nodes. The child node 302 corresponds to the first symbol "a" in the key "ab" 202. Node 302 points to node 306 in a second level 308 of nodes. Node 306 corresponds to symbol "b" in the key "ab" 202. Node 306 points to a leaf node 310 that points to an entry for the key "ab" 202. Leaf nodes generally point to an entry for the key, such as a record associated with the key.

For the second key, "abc" 204, in table of keys 200, node 306 points to a child node 312 corresponding to the symbol "c" of key "abc" 204 in a third level 314 of nodes. Node 312 points to leaf node 316 pointing to an entry for key "abc" 204.

For the third key "abd" 206 in the table of keys 200, node 306 also points to a child node 318 corresponding to the symbol "d" in the third level 314 of nodes. Node 318 in turn points to leaf node 320 pointing to an entry for key "abd" 206.

For the fourth key, "abcd" 208, in the table of keys 200, node 312 points to a child node 322 corresponding to symbol "d" of key "abcd" 208 in a fourth level 324 of nodes 324. Node 322 in turn points to leaf node 326 pointing to an entry for the key "abcd" 208.

For the fifth key, "apples" 210, in the table of keys 200, node 302 points to child node 328 corresponding to symbol "p" of the key "apples" 210 in the second level 308 of nodes. Node 328 points to child node 330 corresponding to the second "p" symbol in a new level 332 of nodes. Node 330 points to node 334 corresponding to symbol "l" in a fourth level 336 of nodes. Node 334 points to node 338 corresponding to symbol "e" in the next level 340 of nodes. Node 338 points to node 342 corresponding to symbol "s" in the sixth level 344 of nodes. Node 342 in turn points to leaf node 346 pointing to an entry for key "apples" 210.

For keys in the table of keys 200 beginning with the symbol "b," node 348 of the first tree level 304 corresponds to the symbol "b." For the key "bl" 212, node 348 corresponding to symbol "b" points to node 350 corresponding to the symbol "l" on the second level of nodes 353 under the node 348 corresponding to the symbol "b." Node 350 in turn points to leaf node 352 that points to an entry for key "bl" 212.

For the key "blueberries" 214, node 350 corresponding to symbol "l" of "blueberries" 214 points to child node 354 corresponding to the symbol "u" in a new level 356 of nodes. Subsequent child nodes 358, 362, 366, 370, 374, 378, 382, and 386 correspond to the next symbols in the key in subsequent levels 360, 364, 368, 372, 376, 380, 384, and 388. Node 386 in turn points to leaf node 390 that points to an entry for the key "blueberries" 214.

Figure 4:
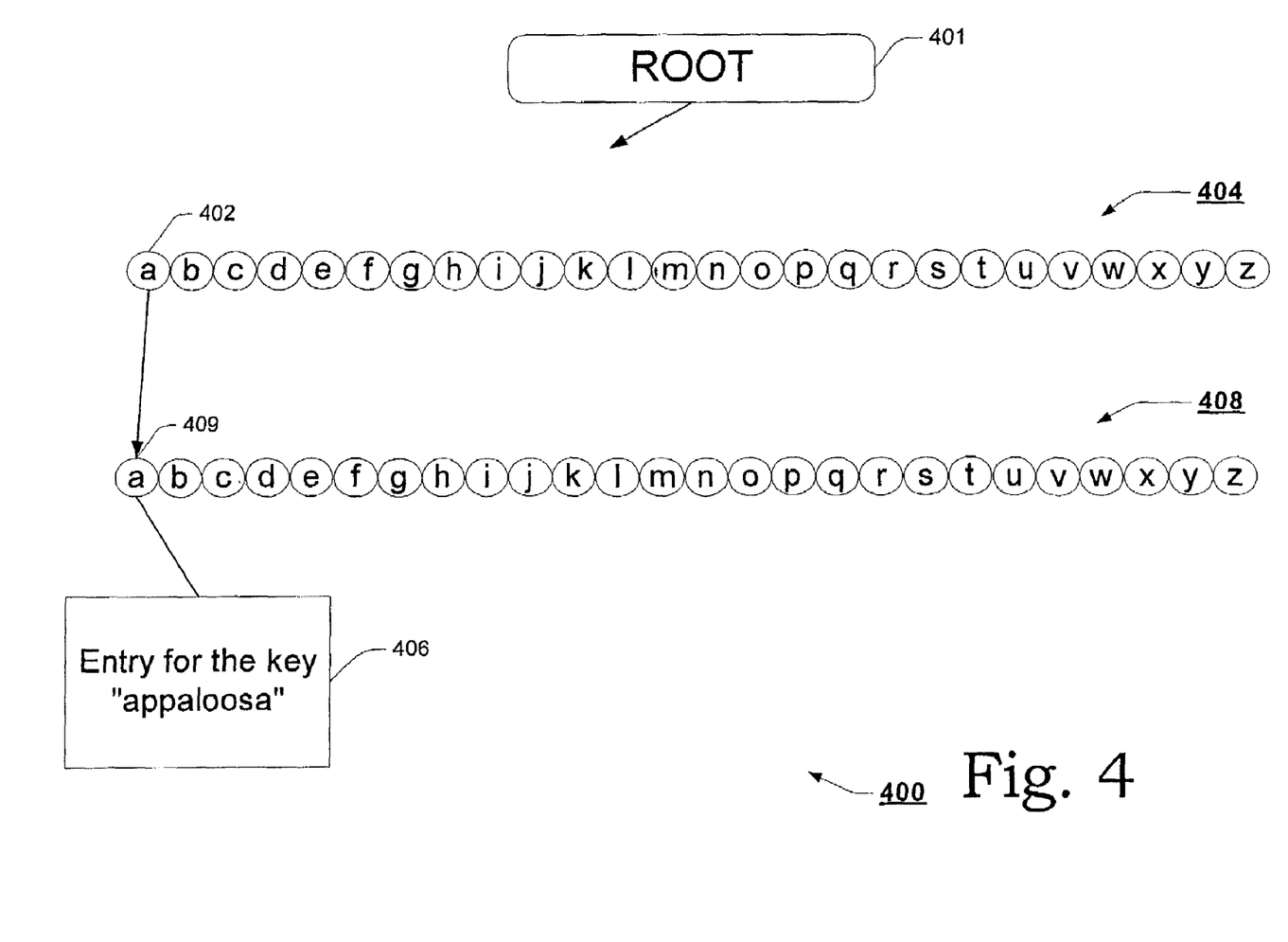
FIG. 4 is a diagrammatic representation of a first example embodiment of an enhanced MRT, according to one aspect of the present invention.

FIG. 4 shows a first example embodiment of a MRT 400 according to the teachings of the present invention, to be compared to the depiction in FIG. 3 of a traditional MRT. In accordance with the illustrated embodiment, the invention creates a root node of a MRT 400 that is organized for storing keys, each key having a string of symbols. The MRT 400 may be created in a register, an electronic memory of a computer, and/or in any other device capable of storing keys in a tree data structure. The tree structure of the MRT 400 is developed by having, for each key, a leaf node that points to an entry for that key. Each leaf node is attached to the tree "n" levels from the root node, where n may be less than the number of symbols in the key to which the leaf node corresponds. Only in one case (where the last symbol in a key is the only symbol that may be used to find an empty node for storing the key entry) will a key entry be stored based on all the symbols in the key, that is, when n equals the key length.

In accordance with one aspect of the invention, an enhanced MRT may be built by assigning to a "physical" level of nodes a logical level number that may be the same or different from the physical level number. The physical level number represents a level of nodes according to a traditional MRT model, and may represent an actual level of memory space assigned for a level of nodes. The logical level number, on the other hand, is assigned to a selected characteristic of a key or of a level of nodes. For example, in one embodiment of the invention, the logical level number represents the key length and the level on a traditional MRT where the key would be stored. Since the logical level number may be assigned to represent a level where a key would be stored, the logical level number can be used to insert and retrieve keys, instead of the traditional MRT technique of inserting and retrieving a key by following a path between nodes on the tree representing every symbol in the key. A key consisting of seven symbols, for example, would cause the physical level of nodes storing the key to be assigned a logical level value of seven. If the physical level number is less than the logical level number assigned, for example if physical level two is assigned a logical level value of seven, resources are saved because, in this example, the seven levels of nodes that would be required in a traditional MRT to store the key are replaced by just two physical levels of nodes.

In accordance with one embodiment of the invention, by describing a long key having many symbols using only the first and last symbols in the key, only two physical levels of nodes to represent the first and last symbols in the key are required, the first physical level of nodes being assigned a logical level number corresponding to the level on a traditional MRT where a node representing the first symbol in the key would reside, and the second physical level of nodes being assigned a logical level number corresponding to the level on a traditional MRT where a node representing the last symbol in the key would reside. An enhanced MRT using the technique just described has links ("pointers") between the logical levels of nodes. Specifically, in the embodiment just described, a pointer is stored in a parent node (in a first logical level of nodes) that directs a search ("points") to a child node (in a second logical level of nodes) representing the last symbol in the key. Instead of a search being required to traverse pointers between each successive symbol in a key to arrive at the last symbol in the key (where an entry for the key is stored) as in traditional MRTs, the present invention may create a path between the first and last symbols in a key, or between fewer symbols of a key than a traditional MRT would use. A long key, which may require many levels of nodes in a traditional MRT, may require only two levels, or a few levels, of nodes in an enhanced MRT of the invention.

Storing a key in an enhanced MRT, according to another aspect of the invention, may require the insertion of a physical and/or logical level of nodes that was left out during the process of storing one or more previous keys. This may be particularly true when a previous key was stored on a logical level corresponding to the last symbol in that key, but logical levels of nodes corresponding to intermediate symbols between the first and last symbols were not assigned. A key currently being stored on the logical basis of its last symbol, for example, and therefore its key length, may require a logical level of nodes that was left out in storing a previous key of different length. In other words, the storage of the previous key has set up a path of pointers that may proceed from the first symbol of the previous key directly to the last symbol of the previous key. In following this truncated path created for the previous key to find a preexisting logical level of nodes that corresponds to the length of the key currently awaiting storage, an inserting process or device may find that the needed logical level was passed over when pointers were established. For example, if logical level four is needed for a key of length four, logical level one may already be linked directly to logical level eleven in the path that is being searched for an insertion point. One method to insert the needed logical level for the new key is to insert one or more new logical levels to be used in common by both the new key and the previously stored key so that pointers through the new "intermediate" logical levels can lead to both keys. Starting at the beginning of each of the two keys and proceeding to successive symbols in each key, an intermediate logical level is inserted for each pair of symbols that match between the two keys. At the point where the successive symbols in the two keys do not match, no more intermediate logical levels are inserted. One more level of nodes may be required to provide a node representing the last symbol of the new key. Pointers may be added and/or adjusted between the new intermediate level(s) of nodes and the preexisting levels of nodes to point to nodes representing the last symbols of the preexisting key and the new key.

The MRT structure created by the invention eliminates many levels of empty nodes. Thus, MRTs created by the invention generally have fewer or no levels of empty nodes, except perhaps when empty levels of nodes result from a key entry being deleted without the node that was storing the key entry being deleted.

Taking the key "appaloosa" as an example, a root node 401 points to the first level of the tree, referred to as the first level of nodes 404. Since the root node 401 resides at the starting level of any logical search, the first symbol of the key, i.e. "a," is used at the root node 401 level to search for a pointer to a child node 402. If the first level of nodes 404 that would include the searched for child node 402 does not exist, it is created. Thus, if child node 402 representing the symbol "a" does not exist, it is created. At this point, if child node 402 now exists, but does not point to any more child nodes of its own, the new entry "appaloosa" can be inserted as a child node. To insert this new node, a new level of nodes, 408, is created. For each new level, a "logical level" is assigned which actually defines the level where the entry would have been inserted in a traditional MRT, if one level were created for each symbol in the key. This "logical level" is set equal to the length of a key being inserted, i.e., the new level of nodes 408 has a logical level of "9" since the key inserted at this level has 9 symbols in its key. Therefore the new node 409 is created corresponding to the ninth symbol of the key, i.e., the trailing "a" in "appaloosa." Finally a leaf node 406 is inserted which is pointed to by the node 409 in the level of nodes 408. The pointer in node 402 in level of nodes 404 is adjusted to point to node 409 in level of nodes 408.

The foregoing MRT embodiment just described and illustrated in FIG. 4 and other aspects of invention may also be understood in terms provided by a paraphrased code implementation of the invention:

Create a root node for storing entries, that is, for storing pointers to one or more child nodes, each representing a symbol in a key. Start at the root node to search for a point of insertion for a key "k1."

Set the current node's logical level variable to the root node.

While the current node's logical level number is less than or equal to the length of key k1:
  Find an entry, T1, corresponding to the nth symbol in key k1, n being the logical level of the node.
  If the current logical level is equal to the length of key k1, then add the entry for key k1 at a node in this logical level, and end.
  Else if the current logical level is not equal to the length of key k1, then go to the next level of nodes:
    If the next level of nodes doesn't exist, then create a new level of nodes and assign to the new level a logical level number equal to the length of the key k1, and insert the entry for key k1 in a node on this logical level, and end.
  Else if the next level of nodes pointed to by T1 exists, then:
    If the logical level number of the next level is not one more than the current level (meaning some intermediate levels have been left out by the invention), then compare any entry T2 at this level to key k1 to determine at which predicted logical level the symbols in key k1 and the key pointed to by T2 would begin to differ (in other words, which starting symbol(s) do each of the keys have in common?).
    If the length of key k1 is such that a new logical level is required between the current level and the level having the key pointed to by T2, that is, between existing levels, then a new intermediate level is created to insert key k1, and a logical level number corresponding to the number of starting symbols that key k1 and the key pointed to by T2 have in common, counting from the beginning of each key.
    At the node representing the last common symbol in key k1 and the key pointed to by T2, insert a new pointer to the level where the key pointed to by T2 exists.
  Increment the current node to the next level.
End the While Loop.

With the current node incremented to the next level, the code will loop back to create a new level of nodes for storing key k1 at a node representing the last symbol in key k1, if the last symbol in key k1 was not the last common symbol between the key k1 and the key pointed to by T2.

The paraphrased code implementation above creates an enhanced MRT that stores keys using a minimum number of levels. When a new key is added to the MRT, the implementation either uses an existing level of nodes, or creates a minimum number of new levels of nodes to maintain the logical structure of the MRT, wherein all pointers are accurately maintained. The code implementation just described, however, is just one example code implementation for practicing the present invention. Many other code variations within the spirit and scope of the invention are possible.

Figure 5:
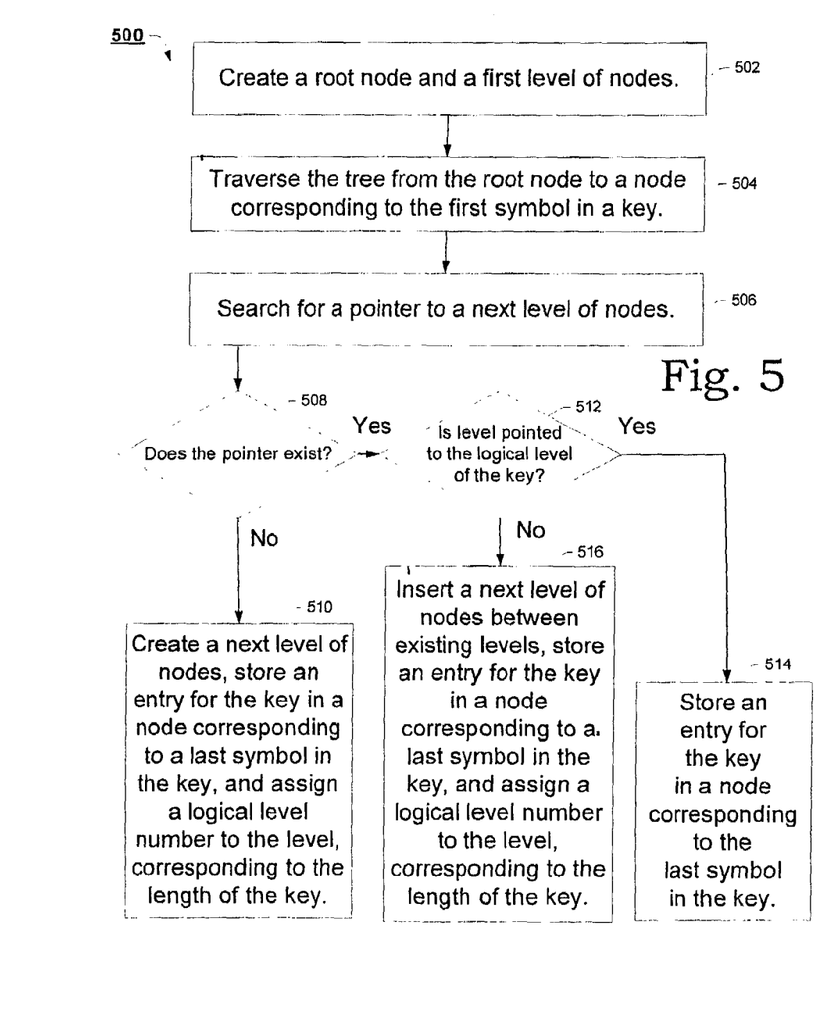
FIG. 5 is a flow diagram of an example method for implementing an enhanced MRT of the present invention.

FIG. 5 shows a flow chart of an example method 500 for implementing a MRT of the present invention. A root node and a first level of nodes are created 502. A pointer is followed from the root node to a node corresponding to the first symbol in a key 504. The node corresponding to the first symbol in the key is searched for a pointer to a next level of nodes 506. Existence of the pointer is assessed 508. If the pointer does not exist, then a next level of nodes is created, an entry for the key is stored in a node corresponding to the last symbol of the key, and a logical level number corresponding to the last symbol in the key and/or length of the key is assigned to the level of nodes in which the key is stored 510. If the pointer exists then the logical level number of the level pointed to is assessed 512. If the pointer points to a level of nodes having a logical level number corresponding to the length of the key, then an entry is stored for the key in a node corresponding to the last symbol of the key 514. If the pointer points to a level of nodes not having a logical level number corresponding to the last symbol in the key and/or the key length, then a new level of nodes is inserted between existing levels, an entry for the key is stored in a node corresponding to the last symbol in the key, and a logical level number is assigned to the level, corresponding to the length of the key 516. This example method is presented for purposes of illustrating the invention. Variations of the method can include storing a key using a different criterion than the length of the key. For example, another method might always arrange the enhanced MRT to produce the shortest paths between the root node and the node to which the entry for the key is attached. In yet another variation, the method might store keys based on the shortest sequence of symbols in a key that is unique from preexisting keys on the MRT.

Figure 6:
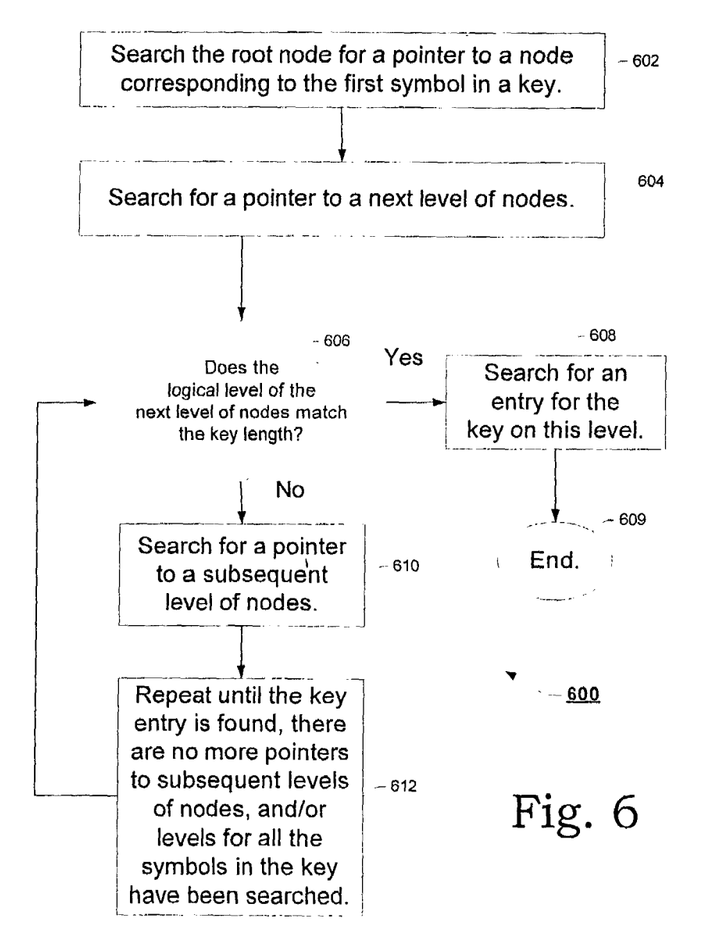
FIG. 6 is a flow diagram of an example method for searching an enhanced MRT, according to one aspect of the present invention.

FIG. 6 shows an example method for searching an enhanced MRT 600, according to one aspect of the invention. The root node is searched for a pointer to a node corresponding to a first symbol in a key 602. The node corresponding to the first symbol in the key is searched for a pointer to a next level of nodes 604. The next level of nodes is checked to ascertain whether its assigned logical level number corresponds to the length of the key 606. If the logical level number of the next level of nodes matches the key length, then an entry for the key is searched for on this level of nodes 608. Finding an entry for the key depends on the presence of an entry in the MRT. If no entry was stored for the key, the search returns a null result and ends 609. If the search finds an entry for the key, the search also ends 609. If the next level of nodes is not assigned the same logical level number that corresponds to the length of the key, then the current node is searched for a pointer to a subsequent next level of nodes 610. The process is repeated until the key entry is found, there are no more pointers to subsequent levels of nodes, and/or a number of levels of nodes corresponding to a number of all the symbols in the key have been searched 612.

Figure 7:
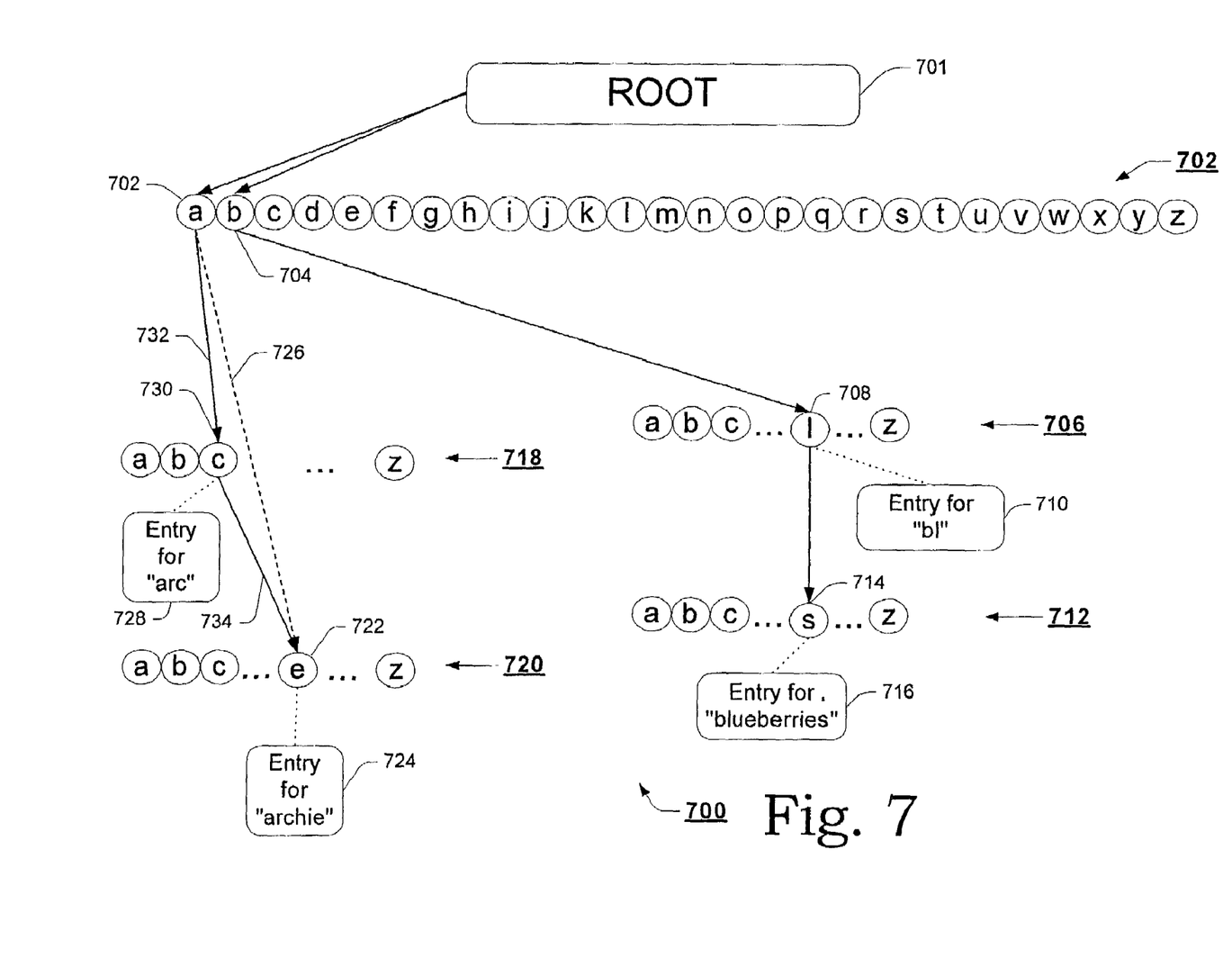
FIG. 7 is a diagrammatic representation of a second example embodiment of an enhanced MRT, according to one aspect of the present invention.

FIG. 7 shows a second example embodiment of a MRT 700 of the invention. For storing the key "bl," the root node 701 is searched for a pointer to the level of nodes 702 and specifically for a node corresponding to the symbol "b." If no node corresponding to "b" exists, a new node 704 that corresponds to "b" is created. (If the node 704 already exists, this node is searched for a pointer to the next level of nodes.) Since the pointer does not exist, a new level of nodes 706 (logical level equal to two) is created. The same procedure is repeated at the level of nodes 706 for the 2nd symbol of the key, i.e., "l." A node 708 corresponding to "l" is created and a leaf node 710 is attached to node 708 for pointing to an entry for key "bl."

For the key "blueberries," node 704 corresponding to the symbol "b" is searched for a pointer to the next level. The node 704 already has a pointer to the next level of nodes 706, which in turn is searched for the second symbol of the key, i.e., "l." Node 708 corresponds to "l." Node 708 is then searched for a pointer to any child nodes on the next level of nodes. If no pointers to a next level of nodes exist, then a next level of nodes 712 is created and a pointer established. Since the key length of "blueberries" is eleven symbols, the new level of nodes 712 is assigned a logical level equal to eleven. At this new level of nodes 712 a new node 714 is created corresponding to the eleventh symbol of the key, i.e., the final "s" in "blueberries." Finally, a leaf node 716 is attached to node 714 for pointing to an entry for the key "blueberries." The pointer in node 708 corresponding to "l" is adjusted to point to node 714 corresponding to "s."

As just described, entries for the key "bl" 710 and the key "blueberries" 716 are attached to adjacent physical levels 706, 712 of the enhanced MRT. However, these adjacent physical levels are not logically adjacent. Level 706 is assigned logical level two while level 712 is assigned logical level eleven. The feature of skipping logical levels occurs when a new key, requiring only a logical level corresponding to its key length for storage on the MRT, differs in length by more than one symbol from a previously stored key having similar starting symbols in the key, for example "bl" and "blueberries." A new key to be added to the enhanced MRT may require a skipped logical level that is not yet present between two adjacent existing levels on the MRT. The new logical level must be inserted between the two adjacent existing levels, and preexisting pointers between the two adjacent existing levels must be adjusted to maintain pointing integrity while including the new logical level.

In accordance with the level insertion aspect of the present invention, FIG. 7 shows the insertion of new logical level of nodes 718 between level of nodes 702 and level of nodes 720. The key "archie" was previously inserted in the MRT 700 by first creating the node 704 corresponding to the symbol "a" on level of nodes 702 having a logical level equal to one and then creating a next level of nodes 720 and assigning a logical level of six to the level of nodes 720. The node 722 was created in level of nodes 720 to correspond to the final "e" symbol in "archie," and an entry for "archie" 724 was attached to node 722. The pointer between level of nodes 702 and level of nodes 720 proceeds from node 702 corresponding to symbol "a" to node 722 corresponding to symbol "e." To insert new key "arc" in the MRT 700, a new logical level of nodes 718 must be inserted between level of nodes 702 and level of nodes 720.

From the root node 701, having arrived at node 702, which corresponds to the first symbol "a" in the new key to be stored, node 702 is searched for pointers, and a pointer 726 to a next level of nodes 720 is found (at this point, level of nodes 718 does not exist yet). It is determined that pointer 726 points to a level of nodes 720 having a logical level of six. The key "arc" will require a level of nodes having a logical level equal to three. The level of nodes 720 is searched for a key entry, and an entry for the key "archie" 724 is found. The key to be inserted, "arc," and the key pointed at, "archie," are compared beginning at the starting symbol and proceeding sequentially until the symbols diverge. The new intermediate logical level 718 will be inserted at a logical level corresponding to the last symbol in the sequence of symbols that the two keys have in common. The key "arc" and the key "archie" have the first three symbols in common, so the new logical level 718 will be inserted and assigned a logical level equal to three corresponding to the symbol "c" in each key. The "c" symbol is coincidentally the last symbol of key "arc," so an entry for "arc" 728 will be attached to node 730 corresponding to the symbol "c."

If the key being stored had been "arcus" instead of "arc," then an additional level of nodes having a logical level equal to five would have been added in addition to level of nodes 718, pointed to from node 730 representing the last common symbol "c" between "arcus" and "archie." The node 730 representing the symbol "c" would have been the branching point for traversing the tree to "arcus" and "archie." But since the key "arc" terminates with a symbol within the path to "archie," no additional levels of nodes are required to store "arc" (that is, the symbols beginning the key "arc" are a subset of the symbols in the key "archie").

The former pointer 726 is adjusted to accommodate the new level of nodes 718, as follows. The process of inserting a new intermediate level of nodes 718 has already established a pointer 732 between node 702 and node 730. A new pointer 734 is established between node 730 in level of nodes 718 and node 722 in level of nodes 720. A search for the key "archie" formerly proceeded through logical levels one and six. After the addition of the new logical level of nodes 718, a search for the key "archie" now proceeds through logical levels one, three, and six. Thus, an enhanced MRT saturated with keys having similar symbols might approach the structural appearance of a traditional MRT. A sparsely populated tree of the present invention, however, is correspondingly more efficient than a sparsely populated traditional MRT.

Figure 8:
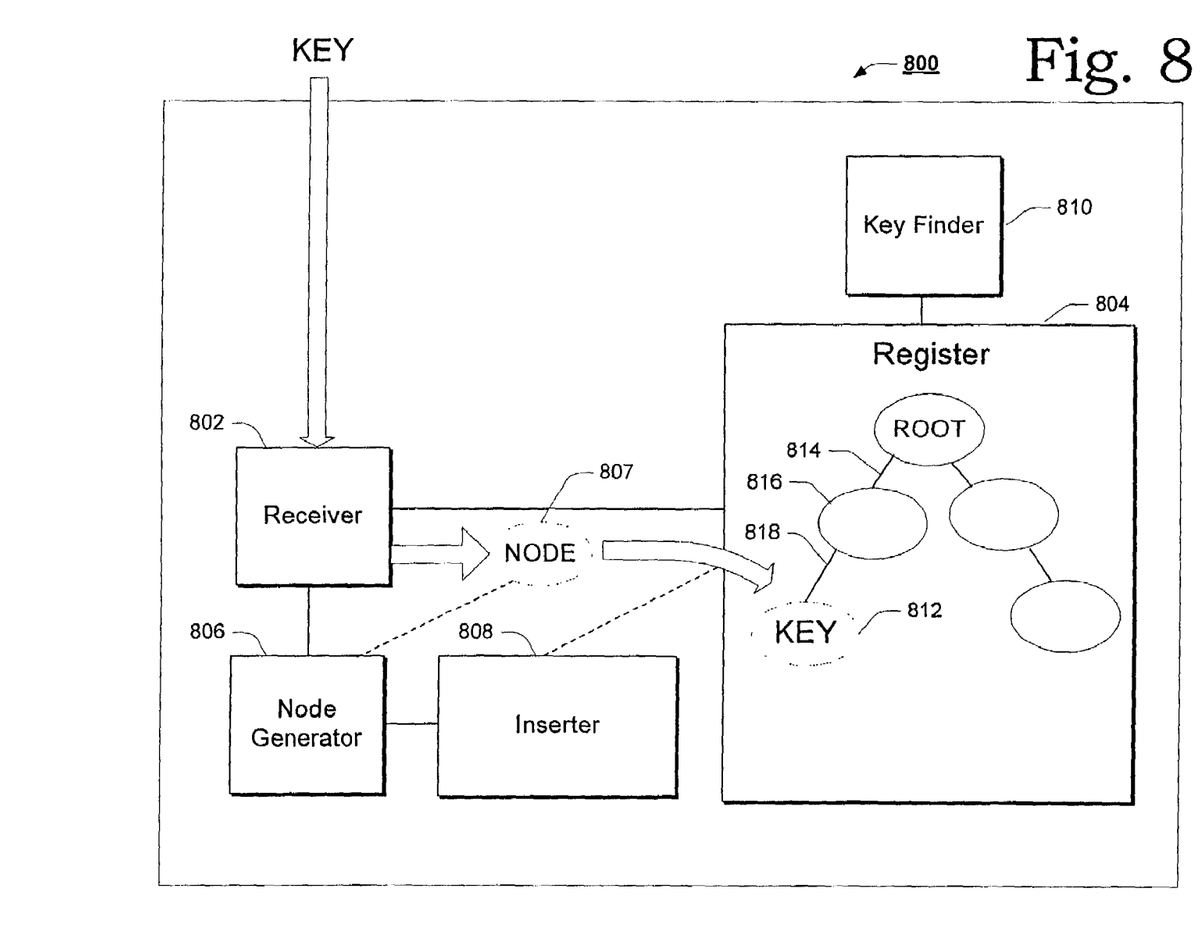
FIG. 8 is a block diagram of an example apparatus 700 for implementing an enhanced MRT of the present invention.

FIG. 8 shows an apparatus 800 embodying the invention. A receiver 802 receives keys, each key having a string of symbols. A register 804 coupled to the receiver 802 stores symbols of keys as nodes in a tree data structure representing a table. A node generator 806 adds a node 807 to the tree as needed for storing an entry for a key based on a symbol in the key. The symbol used as the criterion for storage may be the last symbol in the key representing the key length, or in a variation, may be a symbol which, when added to the sequence of preceding symbols in the key, if any, forms the shortest sequence of symbols needed to store an entry for the key in a node on the tree not already storing an entry for another key. An inserter 808 stores an entry for each received key in the node 807 or memory space pointed to by the node 807 created by the node generator 806.

The apparatus may also comprise a key finder 810 to traverse the tree to find a key. In one embodiment, a key finder 810 searches for a stored key 812 by following a pointer 814 to a node 816 corresponding to the same first symbol as the first symbol in the key being searched for. The key finder 810 assesses the logical level number of the node 816, and if the logical level of node 816 is not the logical level of the key being searched for, searches the node 816 for a pointer corresponding to a next symbol in the stored key 812 being searched for. If the pointer 818 exists, the key finder 810 follows the pointer 818 to a subsequent node 812 on a next logical level, and assesses the logical level number for the level containing this node 812. If the logical level number matches the anticipated logical level number of the searched for key 812, an entry associated with the key 812 is searched for on this level. The stored key 812 being searched for is found. The key finder 810 repeats the process of searching for a next level of nodes and assessing logical level numbers until an entry for the key is found, until there are no more pointers to a next level of nodes, or until levels of nodes corresponding to all the symbols in the key have been searched.

In some apparatus variations, a node may be a memory space and a key may be an entry in the memory space. An apparatus 800 of the invention may be understood in terms of modules, some of which handle the reception and insertion of keys in memory, such as a receiver 802 and an inserter 808, and others that dynamically allocate memory, such as a register 704 and a node generator 806. Although an apparatus embodiment 800 of the invention has been described in terms of "modules" to facilitate description, one or more circuits, components, registers, processors, software subroutines, objects, or any combination thereof could be substituted for one, several, or all of the modules.

Figure 9:
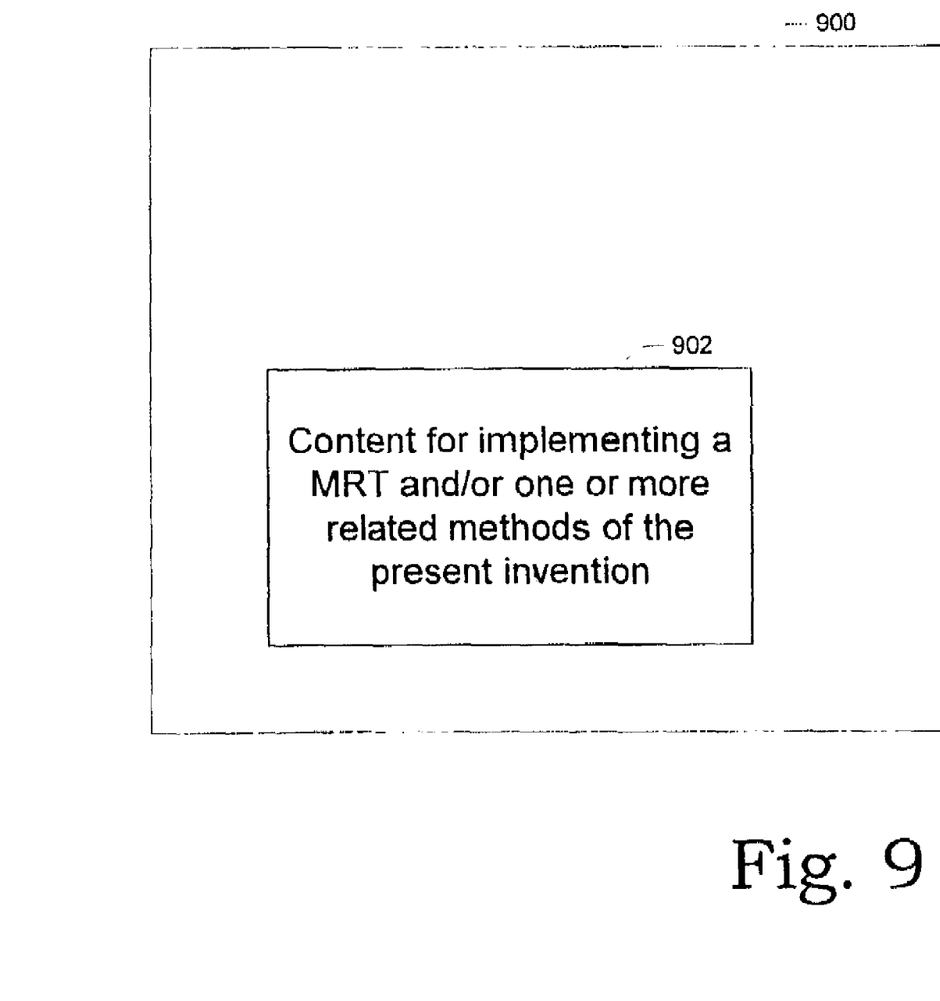
FIG. 9 is a diagrammatic representation of an article of manufacture, which comprises a machine-readable medium that provides instructions that cause a machine to implement an enhanced MRT and/or one or more related methods of the present invention.

FIG. 9 shows an article of manufacture 900, which comprises a machine-readable medium that provides instructions 902 that cause a machine to implement a MRT and/or one or more related methods of the present invention, according to an alternate embodiment of the invention.

The methods and apparatus are described above in their most basic forms but modifications could be made without departing from the basic scope of the invention. It will be apparent to persons having ordinary skill in the art that many further modifications and adaptations can be made. The particular embodiments are not provided to limit the invention but to illustrate it. The scope of the invention is not to be determined by the specific examples provided above but only by the claims below.

What is claimed is:

1. A computer-implemented method comprising:
    identifying an empty node of a multiway radix tree data structure in a memory, the node at a node level of the multiway radix tree;
    assigning a logical level number to a symbol in a key, the key being a string of symbols, the symbol being a symbol in the key that corresponds to the node level of the empty node; and
    storing an entry for the key in the identified empty node, based at least in part on the logical level number instead of on a path between nodes of the multiway radix tree corresponding to every symbol in the key.

2. The method of claim 1, wherein the data structure has node levels for the nodes arranged according to ascending magnitude of logical level numbers assigned to the node levels.

3. The method of claim 2, wherein a minimum number of symbols of the key are used to differentiate the key from other keys stored on the tree, and the data structure has only node levels for the symbols of the key that are used to differentiate the key from other keys stored on the tree.

4. The method of claim 2, wherein a search for the key uses the logical level number corresponding to a length of the key to find the empty node where the key is stored.

5. A computer-implemented method comprising:
    creating a root node and first-level nodes of a tree for storing keys in a memory, each key having a string of symbols;
    creating a pointer from the root node to a node in the first-level of nodes corresponding to the first symbol in a key;
    creating a second level of nodes to store an entry for the key in a node corresponding to the last symbol in the key;
    creating a pointer from the node in the first-level of nodes corresponding to the first symbol in the key to the node in the second level of nodes corresponding to the last symbol in the key;
    assigning the first level of nodes a first logical level value of one, corresponding to the first symbol in the key; and
    assigning a second logical level value of n to the logical level number for the second level of nodes corresponding to the last symbol in the key, wherein n equals the number of symbols in the key.

6. The method of claim 5, wherein a new level of nodes to store an entry for a new key in a node corresponding to the last symbol in the new key is added to and/or inserted between the existing levels of nodes in the tree based on ordering all the levels of nodes in the tree in sequence according to ascending logical level numbers.

7. The method of claim 6, further comprising rearranging pointers that exist between a parent level of nodes and a child level of nodes when a level of nodes having a logical level number between the logical level numbers of the parent level of nodes and the child level of nodes is inserted between the parent level of nodes and the child level of nodes.

8. The method of claim 7, wherein the rearranging includes maintaining a logical path between nodes representing symbols in a key as the number of logical levels between nodes representing a first symbol in the key and a last symbol in the key changes.

9. An apparatus, comprising:
    a register to store an entry for a key, the key having a string of symbols, the entry to be stored in a tree data structure representing a table, the tree data structure organized in node levels, a first node level to have a root node, and a next node level to have a sub-node; and
    a node generator to add a node to the tree data structure, the node to have a node level corresponding to a symbol in the key, the node to be assigned a logical level number corresponding to a length of the key instead of corresponding to the node level corresponding to the symbol;
    wherein the logical level number of the added node is used to find the key instead of a path between nodes corresponding to each symbol in the key.

10. The apparatus of claim 9, further comprising:
a receiver to receive keys; and
an inserter to insert an entry for each key to be stored into a node created by the node generator.

11. The apparatus of claim 9, further comprising:
a finder to:
follow a pointer to a node corresponding to the first symbol of the key being searched for;
search the node corresponding to the first symbol of the key for a pointer to a node level having the logical level number of the key being searched for; and
search for an entry for the key on the node level having the logical level number of the key being searched for.

* * * * *